Patented Mar. 12, 1940

2,193,678

UNITED STATES PATENT OFFICE 2,193,678

ARYLAMIDE

Friedrich Muth, Leverkusen I. G.-Werk, Germany, assignor to General Aniline & Film Corporation, a corporation of Delaware No Drawing. Application April 3, 1939, Serial No. 265,770. In Germany April 12, 1937

5 Claims. (Cl. 260—559)

The present invention relates to new intermediates suitable for the manufacture of water-insoluble azodyestuffs and to a method of preparing these products; more particularly it relates to amides of 3-hydroxy-fluorene-2-carboxylic acids.

My new intermediates are obtainable by converting 3-hydroxy-fluorene-2-carboxylic acids, having a free 4-position, or the functional derivatives thereof into the amides of aromatic or heterocyclic mono- or diamines. This can be effected by starting from the halides or esters of the said carboxylic acids and causing the same to react with aromatic or heterocyclic mono- or diamines or by reacting aromatic or heterocyclic isocyanic acid esters with the 3-hydroxy-fluorene-2-carboxylic acids. The 3-hydroxy-fluorene-2-carboxylic acids which serve as starting materials for the above process can be obtained according to my copending application Ser. No. 200,128, filed April 5, 1938.

The new amides may be substituted in that benzene nucleus of the fluorene which does not bear the hydroxy group and the carboxylic acid amide group and also at the carbon atom in the 9-position. As substituents may be mentioned alkyl, alkoxy, nitro, halogen, trifluoromethyl, phenylamino, alkyl-sulfone, aralkylsulfone, arylsulfone, alkyl-CO-, aryl-CO- and so on; also a further nucleus may be condensed to the mentioned benzene nucleus of the fluorene, forming in this way, for instance, a naphthalene ring system or if the nucleus condensed to the fluorene is hydrogenated, a tetrahydronaphthalene ring system. Such substituted amides can be obtained from the following 3-hydroxy-fluorene-2-carboxylic acids; the methyl-3-hydroxy-fluorene-2-carboxylic acids, the chloro-3-hydroxyfluorene-2-carboxylic acids, the methoxy-3-hydroxy-fluorene-2-carboxylic acids, which bear the substituent in question in one of the positions 5, 6, 7 or 8 and also from the 3-hydroxy-fluorene-2-carboxylic acids substituted in the 9-position; further the benzo-3-hydroxy-fluorene-2-carboxylic acids having the benzene nucleus condensed to the positions 5.6, 6.7 or 7.8 and also the corresponding tetrahydro-acids.

My new amides show in comparison with other amides derived from multinuclear o-hydroxy-carboxylic acids a good solubility; thus they dissolve in general in hot aqueous lyes. They are distinguished by a very good affinity towards cellulosic fibers and by a good coupling energy and are, therefore, suitable for the manufacture of water-insoluble azo-dyestuffs according to the ice-color method.

This application is in part a continuation of my copending application Ser. No. 200,076, filed April 5, 1938.

The following examples illustrate the invention, without, however, restricting it thereto, the parts being by weight:

Examples 226 parts of 3-hydroxy-fluorene-2-carboxylic acid and 123 parts of 2-anisidine are suspended in toluene. 60 parts of phosphorus trichloride are dropped in at 60° C. and the whole is heated to boiling until the formation of hydrochloric acid has terminated. Sodium carbonate solution is added to the reaction mixture until it has assumed a strongly alkaline reaction and the toluene is then removed by evaporation. The residue is purified by dissolving it with dilute caustic soda lye and precipitating with acid. By crystallization from alcohol or toluene the new arylide of the formula

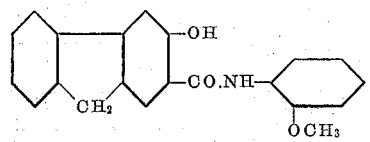

is obtained in short monosymmetrical prisms having a melting point of 176–177° C.

The arylamide obtained in an analogous manner with 1-amino-2.5-dimethoxybenzene has the following formula:

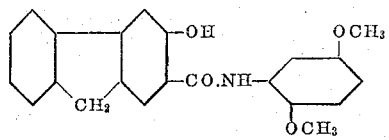

and crystallizes from toluene in yellow needles of M. P. 186–187° C.

In the following table the melting points are given of further amides of 3-hydroxy-fluorene-2-carboxylic acid with amines such as

| | Melting point, ° C. |
|---|---|
| Aniline | 246 |
| 2-toluidine | 211 |
| 3-toluidine | 232 |
| 4-toluidine | 265 |
| 2-aminoethylbenzene | 168 |
| 3-anisidine | 213 |
| 4-anisidine | 263 |
| 2-phenetidine | 168 |
| 3-chloroaniline | 233 |
| 4-chloroaniline | 284 |
| 3-fluoroaniline | 244 |
| 3-aminobenzotrifluoride | 225 |
| 4-aminophenyltrifluoro-methylsulfone | 278 |
| 3-nitroaniline | 288 |
| 1-amino-2.3-dimethylbenzene | 230 |
| 1-amino-2.4-dimethylbenzene | 206 |
| 1-amino-2.5-dimethylbenzene | 169 |
| 1-amino-3.4-dimethylbenzene | 227 |
| 1-amino-3.5-dimethylbenzene | 207 |
| 1-amino-2-methyl-4-methoxybenzene | 228 |
| 1-amino-2-methyl-5-methoxybenzene | 160 |
| 1-amino-3-methyl-4-methoxybenzene | 200 |
| 1-amino-3-methyl-6-methoxybenzene | 210 |
| 1-amino-4-methyl-3-methoxybenzene | 202 |
| 1-amino-2-methyl-4-chlorobenzene | 236 |
| 1-amino-2-methyl-5-chlorobenzene | 238 |
| 1-amino-2.4-dimethoxybenzene | 153 |
| 1-amino-3.5-dicyanobenzene | 265 |
| 1-amino-2-methoxy-4-chlorobenzene | 232 |
| 1-amino-2-methoxy-5-chlorobenzene | 215 |
| 1-amino-4-methoxy-3-chlorobenzene | 230 |
| 1-amino-2-methoxyphenyl-5-trifluoro-methylsulfone | 251–252 |
| 1-amino-2.4-dimethoxy-5-chlorobenzene | 249 |
| 1-amino-2.4-dimethoxy-5-trifluoro-methylbenzene | 242 |
| 1-amino-2.5-dimethoxy-4-chlorobenzene | 232 |
| 1-amino-2-methoxy-5-methyl-4-chlorobenzene | 212 |
| 1-amino-4-chloro-2-trifluoro-methyl-benzene | 216 |
| 1-amino-2-chloro-5-trifluoro-methyl-benzene | 238 |
| 1-amino-2-bromo-5-trifluoro-methyl-benzene | 243 |
| 1-amino-2-nitro-4-trifluoro-methyl-benzene | 280 |
| 1-amino-2-nitro-5-trifluoro-methyl-benzene | 291 |
| 1-amino-3-chloro-5-trifluoro-methyl-benzene | 203–204 |
| 1-amino-3.5-di-trifluoro-methylbenzene | 224 |
| 1-naphthylamine | 221 |
| 2-naphthylamine | 270 |
| α-tetrahydronaphthylamine | 205 |
| 2-amino-3-methoxy-diphenylene-oxide | 296 |
| Dianisidine (with 2 mols acids) more than | 300 |

In the same way the amides of substituted 3-hydroxy-fluorene-2-carboxylic acids are obtained. 6-methyl-3-hydroxy-fluorene-2-carboxylic acid yields with 2-anisidine the product of the following formula:

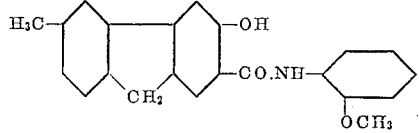

which melts at 172° C. The corresponding amides with

| | ° C. |
|---|---|
| 2-toluidine has the melting point | 217 |
| 1-amino-2.5-dimethoxybenzene do | 189 |
| 1-amino-2.5-dimethoxy-4-chlorobenzene do | 206 | and the 9-methyl-3-hydroxy-fluorene-2-carboxylic acid yields with 1-amino-2.5-dimethoxybenzene the product of the formula:

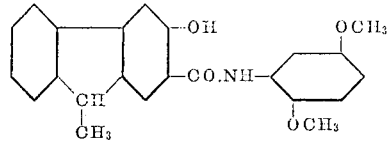

which crystallizes from alcohol in short needles of M. P. 202° C. The 9-methyl-3-hydroxy-fluorene-2-carboxylic acid (compact needles from toluene M. P. 225° C.) is obtained from 9-methyl-3-hydroxy-fluorene according to my copending application mentioned above. The 9-methyl-3-hydroxy-fluorene is obtained as follows: 3-methoxy-fluorenone is converted by Grignard's reaction into 3-methoxy-9-methyl-fluorenol, reduced to 3-methoxy-9-methyl-fluorene and demethylated to 3-hydroxy-9-methyl-fluorene (white needles from ligroin M. P. 95-96° C.). If in the above Grignard's reaction instead of methyl-magnesium bromide aryl-, aralkyl- or other alkyl-magnesium halides are used the corresponding 9-aryl-, -aralkyl- or -alkyl-fluorene derivatives are obtained. According to known methods also the corresponding 9.9-disubstituted derivatives can be prepared.

The 6-chloro-3-hydroxy-fluorene-2-carboxylic acid yields with o-toluidine the arylide of the formula:

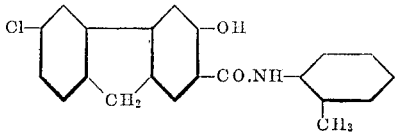

melting at 240° C. Additional arylides of this acid are made with

| | ° C. |
|---|---|
| 2-anisidine melting point | 188 |
| 1-amino-2-methyl-4-methoxy-benzene do | 259 |
| 3-amino-benzotrifluoride do | 215 |
| 1-amino-3.5-di-trifluoro-methyl-benzene do | 219 |

The 6-chloro-3-hydroxy-fluorene from which the 6-chloro-3-hydroxy-fluorene-2-carboxylic acid (colorless needles from butylalcohol M. P. 293° C.) is obtained, is prepared as follows: 4-chloro-2-amino-benzoic acid is acted upon with benzene-sulfochloride to 2-benzene-sulfamino-4-chloro-benzoic acid (white needles from glacial acetic acid M. P. 188–189° C.), converted into 2-benzene-sulfamino-4-chlorobenzoyl chloride (white needles from chloroform M. P. 180–181° C.), condensed with anisol to 2-benzene-sulfamino-4-chloro-4'-methoxy-benzophenone (compact prisms from toluene M. P. 139–140° C.), saponified, diazotized and condensed (ring-formation) to 6-chloro-3-methoxy-fluorenone (fine yellow needles from alcohol M. P. 178° C.), reduced to 6-chloro-3-methoxy-fluorene (nacreous scales M. P. 105° C.) and demethylated to 6-chloro-3-hydroxy-fluorene (white needles from toluene M. P. 159–160° C.).

From the 7-chloro-3-hydroxy-fluorene-2-carboxylic acid may be mentioned the 1-(7'-chloro-3'-hydroxy-fluorene-2-carboylamino)-2.5-dimethoxy-benzene of the formula:

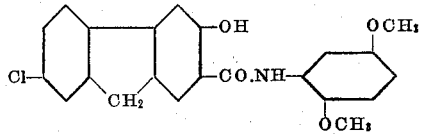

melting at 215° C. The 7-chloro-3-hydroxy-fluorene-2-carboxylic acid (white needles M. P. 293° C.) is obtained from the 7-chloro-3-hydroxy-fluorene which latter is prepared in a similar way as the 6-chloro-product: 5-chloro-2-amino-benzoic acid - 2 - benzene-sulfamino-5-chloro-benzoic acid (colorless prisms from benzene M. P. 185° C.)→2-benzene-sulfamino-5-chlorobenzoyl chloride (colorless prisms from carbon tetrachloride M. P. 142–143° C.)→2-benzene-sulfamino-5-chloro-4'-methoxy-benzophenone (prisms from alcohol M. P. 125° C.)→7-chloro-3-methoxy-fluorenone (short yellow prisms from alcohol M. P. 159–160° C.)→7-chloro-3-methoxy-fluorene (colorless needles from dilute alcohol M. P. 61° C.)→7-chloro-3-hydroxy-fluorene (colorless needles from toluene M. P. 126° C.).

The 6.7-benzo-3-hydroxy-fluorene-2-carboxylic acid yields, with 2-anisidine, an amide of the formula:

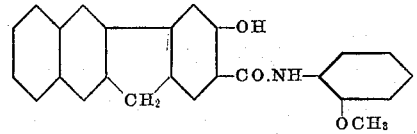

which melts at 210° C., with 1-amino-2.5-dimethoxybenzene an amide of the melting point 230° C.

I claim:
1. As new products arylamides of the general formula

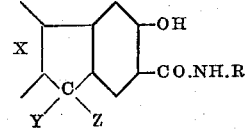

wherein X stands for one of the group consisting of the benzene nucleus, the naphthalene nucleus, and the alkyl and halogen substitution products thereof, Y and Z stand for radicals of the group consisting of hydrogen, alkyl, aralkyl and aryl, and R stands for an aromatic radical, being water-insoluble substances.

2. As new products arylamides of the general formula

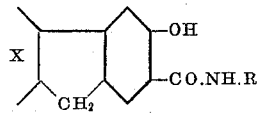

wherein X stands for one of the group consisting of the benzene nucleus, the naphthalene nucleus, and the alkyl and halogen substitution products thereof, and R stands for an aromatic radical, being water-insoluble substances.

3. As a new product the arylamide of the formula

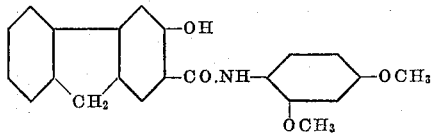

melting at 153° C.

4. As a new product the arylamide of the formula

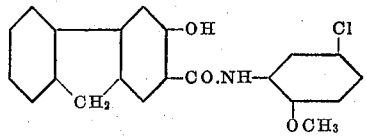

melting at 215° C.

5. As a new product the arylamide of the formula

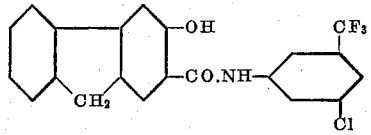

melting at 203–204° C.

FRIEDRICH MUTH.